US012608909B2

(12) United States Patent
Dev et al.

(10) Patent No.: US 12,608,909 B2
(45) Date of Patent: Apr. 21, 2026

(54) COMPONENT IDENTIFICATION

(71) Applicant: CDS Visual, Inc., San Jose, CA (US)

(72) Inventors: Bodhayan Dev, Sturbridge, MA (US);
Aaron Smith, Morgan Hill, CA (US);
Girish Juneja, Lexington, MA (US);
Prem Swaroop, Brookline, MA (US)

(73) Assignee: CDS Visual, Inc., San Jose, CA (US)

( * ) Notice: Subject to any disclaimer, the term of this patent is extended or adjusted under 35 U.S.C. 154(b) by 282 days.

(21) Appl. No.: 18/400,923

(22) Filed: Dec. 29, 2023

(65) Prior Publication Data

US 2025/0218151 A1 Jul. 3, 2025

(51) Int. Cl.
*G06V 10/74* (2022.01)
*G06F 40/40* (2020.01)
*G06V 20/69* (2022.01)

(52) U.S. Cl.
CPC .............. *G06V 10/74* (2022.01); *G06F 40/40* (2020.01); *G06V 20/698* (2022.01)

(58) Field of Classification Search
CPC .............................................. G06V 10/74–761
See application file for complete search history.

(56) References Cited

U.S. PATENT DOCUMENTS

| | | | |
|---|---|---|---|
| 9,430,792 B2 | 8/2016 | Begin, Jr. et al. | |
| 11,348,325 B2 | 5/2022 | Major et al. | |
| 2019/0392212 A1* | 12/2019 | Sawhney | .................. G06T 7/70 |
| 2022/0351427 A1 | 11/2022 | Lin et al. | |

FOREIGN PATENT DOCUMENTS

WO WO2023277907 A1 * 1/2023 ......... G01N 33/4925

OTHER PUBLICATIONS

International Search Report and Written Opinion in International Appln. No. PCT/US2024/062022, mailed on Mar. 18, 2025, 19 pages.
prnewswire.com [online], "CDS Visual Launches Partable, a Breakthrough in Spare Parts Identification and Selection," Oct. 19, 2023, retrieved on May 8, 2024, retrieved from URL<https://www.prnewswire.com/news-releases/cds-visual-launches-partable-a-breakthrough-in-spare-parts-identification-and-selection-301962265.html>, 3 page.

* cited by examiner

*Primary Examiner* — Raphael Schwartz
(74) *Attorney, Agent, or Firm* — Fish & Richardson P.C.

(57) ABSTRACT

A method includes obtaining a test image captured by a camera of a mobile device, the image including a test component; processing the test image using a machine learning model, wherein the machine learning model has been trained by obtaining a 3D model file representing a 3D model of a training component, generating a plurality of images of the training component based on the 3D model file, the plurality of images differing from one another in at least one of orientation, background, or texture, determining locations of the training component, and training the machine learning model using the plurality of images and the locations of the training component, wherein the machine learning model is trained to detect the training component in photographs captured by mobile devices; and presenting one or more candidate identities of the test component based on an output of the machine learning model.

20 Claims, 12 Drawing Sheets

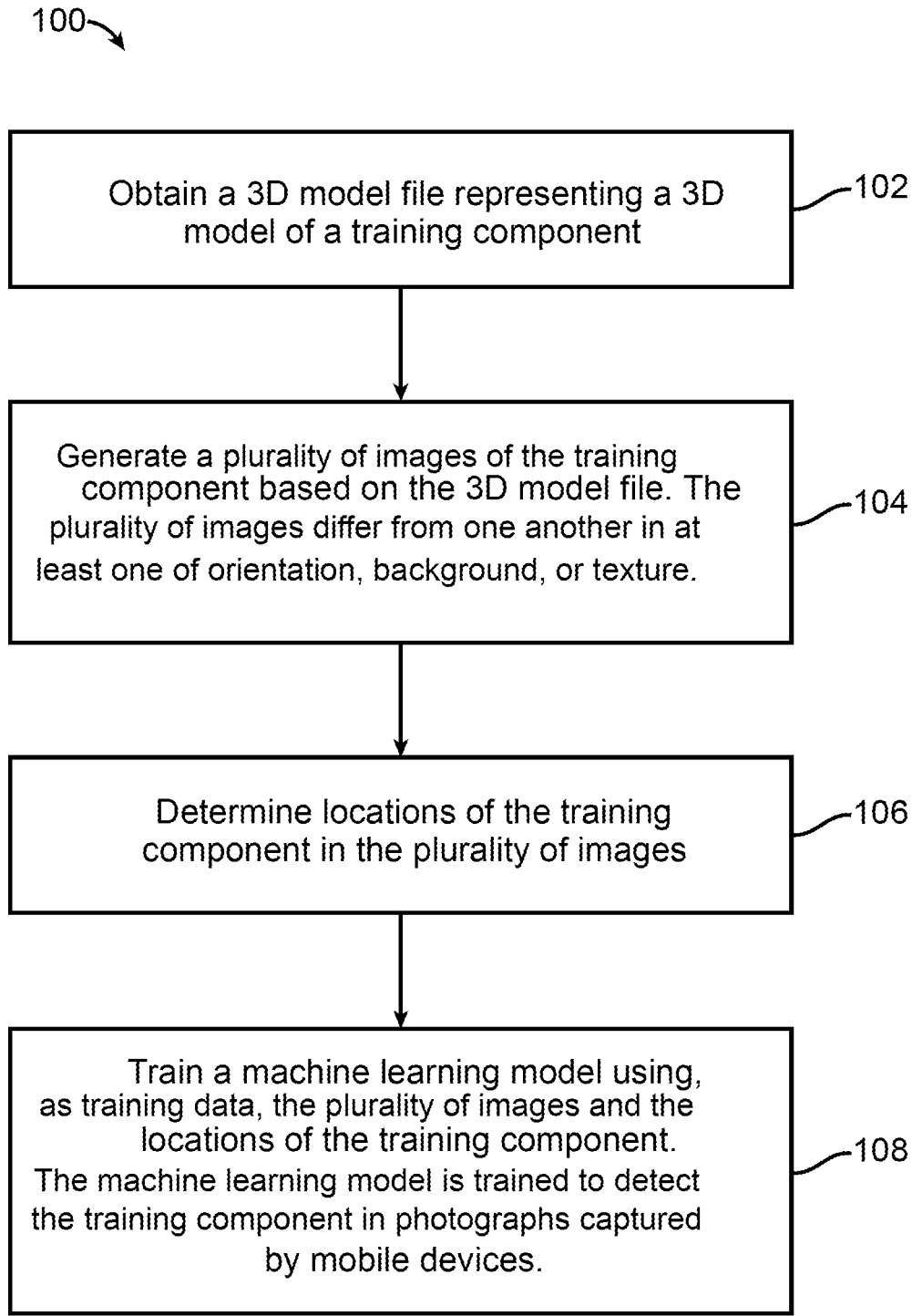

100

| Obtain a 3D model file representing a 3D model of a training component | 102 |

| Generate a plurality of images of the training component based on the 3D model file. The plurality of images differ from one another in at least one of orientation, background, or texture. | 104 |

| Determine locations of the training component in the plurality of images | 106 |

| Train a machine learning model using, as training data, the plurality of images and the locations of the training component. The machine learning model is trained to detect the training component in photographs captured by mobile devices. | 108 |

| Id | Step | Completion_Rate | Status |
|---|---|---|---|
| 2023_12_01_08_36_53 | Training (3/4) | 90% | In Progress |
| 2023_11_30_15_23_43 | Training | Er | Failed |
| 2023_11_30_14_54_21 | Data Preparation (2/4) | 50% | In Progress |

Obtain a test image captured by
a camera of a mobile device, the image
including a test component          ~602

Process the test image using a machine
learning model trained to detect
components in photographs          ~604

Present, at the mobile device, one or
more candidate identities of the test
component based on an output of the
machine learning model          ~606

COMPONENT IDENTIFICATION

FIELD OF THE DISCLOSURE

Technologies are described for identifying components, such as mechanical and electrical parts.

BACKGROUND

To facilitate purchases of components, it can be desirable to make component identification user-friendly and reliable. Visual identification of components can provide a quick and intuitive approach.

SUMMARY

Some aspects of this disclosure describe a method. The method includes obtaining a test image captured by a camera of a mobile device, the image including a test component; and processing the test image using a machine learning model. The machine learning model has been trained by obtaining a three-dimensional (3D) model file representing a 3D model of a training component, generating a plurality of images of the training component based on the 3D model file representing the training component, wherein the plurality of images differ from one another in at least one of orientation, background, or texture, determining locations of the training component in each of the plurality of images, and training the machine learning model using, as training data, the plurality of images and the locations of the training component, wherein the machine learning model is trained to detect the training component in photographs captured by mobile devices. The method further includes presenting, at the mobile device, one or more candidate identities of the test component based on an output of the machine learning model.

This and other described methods can have one or more of at least the following characteristics.

In some implementations, determining the locations of the training component includes determining bounding boxes of the training component based on known rendered coordinates of the training component in the plurality of images.

In some implementations, determining the locations of the training component includes converting the plurality of images to a grayscale format; determining contours associated with backgrounds of the plurality of images in the grayscale format; and determining the locations of the training component based on the contours.

In some implementations, the machine learning model has been trained by: determining an image similarity between a first image of the training component and a second image of the training component, the training component having different orientations in the first image and the second image; and in response to the similarity being above a threshold value, including an image derived from the first image in the plurality of images used to train the machine learning model, and excluding images derived from the second image from the plurality of images used to train the machine learning model.

In some implementations, the machine learning model includes an object detection model, the test image includes a second test component, and the method includes presenting, at the mobile device, one or more candidate identities for each of the test component and the second test component based on the output of the machine learning model.

In some implementations, the method includes obtaining a first 3D model file of a first candidate component corresponding to a first candidate identity, and a second 3D model file of a second candidate component corresponding to a second candidate identity; determining, based on the first 3D file and the second 3D file, respective product hierarchies of the first candidate component and the second candidate component, the respective product hierarchies indicating that the first candidate component and the second candidate component are included in separate products; determining a similarity between an image of the first candidate component and an image of the second candidate component; and determining, based on the similarity and based on the first candidate component and the second candidate component being included in separate products, to include the first candidate identity in the one or more candidate identities presented at the mobile device, and to not include the second candidate identity in the one or more candidate identities presented at the mobile device.

In some implementations, the one or more candidate identities includes an identity of the training component, and the method includes: determining, based on the 3D model file representing the 3D model of the training component, a product hierarchy of the training component; and presenting, at the mobile device, a representation of the product hierarchy.

In some implementations, the 3D model file representing the 3D model of the training component represents a plurality of components including the training component, and generating the plurality of images includes isolating the training component from other components of the plurality of components.

In some implementations, obtaining the 3D model file representing the 3D model of the training component includes converting a source 3D model file, which represents curved surfaces of the training component in a first format, into the 3D model file representing the 3D model of the training component using a mesh in a second format.

In some implementations, the method includes processing the one or more candidate identities using a large language model that has been trained using, as training data, a plurality of 3D model files; and presenting, at the mobile device, based on an output of the large language model, a predicted product in which the test component is included.

In some implementations, the large language model has been trained using, as training data, product description mapping data.

In some implementations, processing the one or more candidate identities includes processing a context of the test component using the large language model.

In some implementations, presenting the one or more candidate identities includes presenting a virtual reality or augmented reality interface configured to facilitate interaction between a user of the mobile device and a simulated version of a first candidate component corresponding to a first candidate identity of the one or more candidate identities.

In some implementations, the method includes processing the one or more candidate identities using a large language model that has been trained using, as training data, documents providing information about components corresponding to the one or more candidate identities; and presenting, at the mobile device, based on an output of the large language model, a tutorial relating to the test component.

The described methods can be associated at least with corresponding systems, processes, devices, and/or instructions stored on non-transitory computer-readable media. For example, some aspects of this disclosure describe a non-transitory computer-readable medium tangibly encoding a computer program operable to cause a data processing apparatus to perform operations of the foregoing method and/or other methods described herein. Further, some aspects of this disclosure describe a system including one or more computers programmed to identify components; and a mobile device communicatively coupled with the one or more computers, the mobile device being programmed to perform operations of the foregoing method and/or other methods described herein and to send images of components to the one or more computers for identification.

The details of one or more implementations are set forth in the accompanying drawings and the description below. Other aspects, features and advantages will be apparent from the description and drawings, and from the claims.

BRIEF DESCRIPTION OF THE DRAWINGS

FIG. 1 is a diagram showing an example of a model training process.

FIGS. 3A-3B are examples of user interfaces.

DETAILED DESCRIPTION

This disclosure relates to capturing and processing images of components for component identification. For example, a mobile device can capture an image of a component (e.g., a screw or a machined part), or of multiple components (e.g., assembled as a product), and the image can be processed using a machine learning model trained to identify components. To facilitate accurate training of the machine learning model across a wide range of components and capture conditions, training data for the machine learning model can include images generated from computer-aided design (CAD) files or other 3D model files of the components. As such, the training data can include a wider variety of images than may result from, for example, training only on photographs of the components. Moreover, the machine learning model can be trained to identify new components through a user-friendly process of file upload, e.g., as opposed to requiring image capture. These and other advantages provided by some implementations of the systems and processes discussed herein will be apparent from the following description.

FIG. 1 shows an example of a process 100 for training a machine learning model according to some implementations of this disclosure. In some implementations, the process 100 can be performed by a mobile device (e.g., a smartphone, tablet, wearable device, laptop, or another type of mobile device) and/or by a computer system remote from the mobile device, such as a cloud computing system or server system. For example, a mobile device can provide a user interface for CAD file upload, training monitoring, user feedback, etc., while the most computationally-intensive aspects of the process 100 (e.g., machine learning model training) can be performed at the remote computer system. This arrangement can provide for overall efficient training. However, the process 100 need not be performed by a remote computer system; elements of the process 100, and of other processes discussed herein, such as process 600, can in various implementations be performed by a mobile device, by a remote computer system, by another type of computing device, or by two or more of those in combination.

Figure 2:
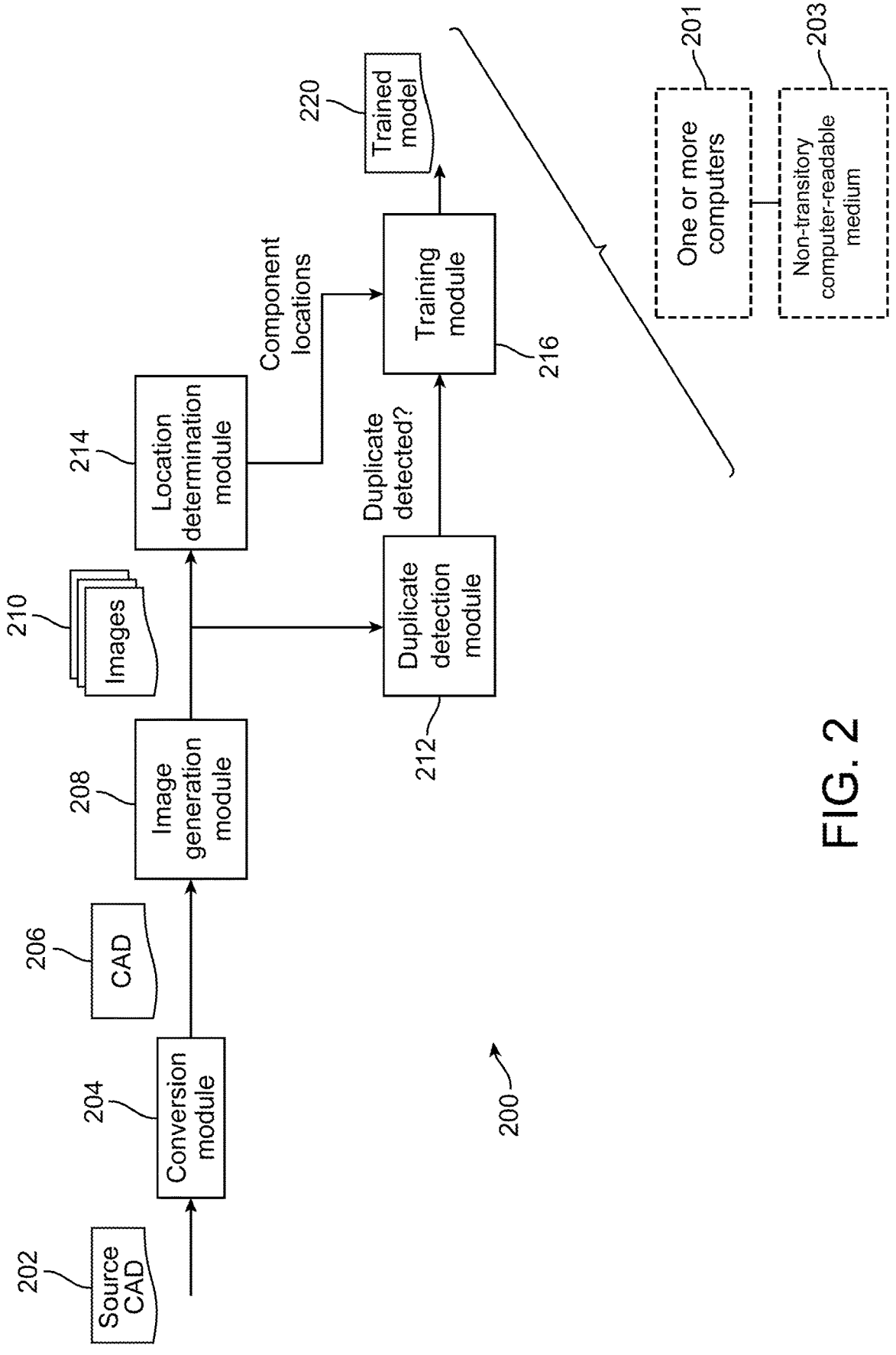
FIG. 2 is a diagram showing an example of a system associated with model training.

FIG. 2 shows an example of a system 200 associated with process 100. For example, elements of the system 200 can be configured to perform process 100 to train a machine learning model 220. For example, the system 200 can include one or more computers 201 (e.g., a data processing apparatus) and a non-transitory computer-readable medium 203 tangibly encoding a computer program operable to cause the one or more computers 201 to perform process 100 and/or associated operations described herein. The one or more computers 201 and/or the non-transitory computer-readable medium 203 can implement at least some or all of the modules of FIG. 2.

The system 200 includes a conversion module 204, an image generation module 208, a location determination module 214, a duplicate detection module 212, and a training module 216. The modules 204, 208, 212, 214, 216 can be hardware and/or software modules, e.g., implemented by one or more computer systems. For example, the modules 204, 208, 212, 214, 216 can include one or more hardware processors and one or more computer-readable mediums encoding instructions that, when executed by the one or more hardware processors, cause the one or more hardware processors to perform operations such as portions of process 100 and/or other processes described herein. The modules 204, 208, 212, 214, 216 can be software modules executed by one or more hardware processors based on instructions encoded in one or more computer-readable mediums. In some implementations, the modules 204, 208, 212, 214, 216 are modules of a computer system such as a cloud computing system or server system, such that process 100 and associated operations can advantageously be performed largely or entirely on a remote computer system, in some cases reducing processing time compared to processes that require execution on a mobile device. The modules 204, 208, 212, 214, 216 need not be separate but, rather, can be at least partially integrated together as one or more combined modules or fully integrated together as a single program. The modules 204, 208, 212, 214, 216 can be modules of a remote computer system.

The process 100 includes obtaining a CAD file 206 that represents a training component (102). The CAD file 206 includes data that describes the shape of the training component, e.g., by defining surfaces of the training component. Non-limiting examples of types of CAD file that can be used as the CAD file 206 include .stp files, .stl files, .amf files, .obj files, .fbx files, .3ds files, .ply files, and off files. Non-limiting examples of types of training component that can be represented by the CAD file 206 include mechanical parts, products composed of multiple parts, machinery, electronic devices, etc.

Although this description uses the terminology of "CAD files," in some implementations the input file is a three-dimensional (3D) model file that represents a 3D model of the training component, e.g., any of the aforementioned file formats or a different 3D model file format, without necessarily being derived from any specific CAD software. For example, the 3D model can represent the training component using a mesh, using surfaces, using a point cloud, or using another suitable 3D modeling approach. The 3D model can be obtained in various ways. For example, in some implementations the 3D model is obtained by using a camera with a 360° motorized rotating turntable to image the candidate component, combined with object reconstruction/processing to obtain a 3D model of the candidate component. As another example, a depth sensor (e.g., a LiDAR sensor) can be used to scan the candidate component and obtain the 3D model of the candidate component. Once obtained, the 3D model represented by the 3D model file need not include any graphical aspects of the possible imaging processes (e.g., rotating image capture, LiDAR scanning, etc.) initially used to obtain the 3D model; rather, the 3D model can represent surfaces/topology of the candidate component, as if the 3D model were obtained without an imaging process. Accordingly, references herein to CAD files should be understood to encompass 3D model files in general.

In some implementations, the CAD file 206 is obtained in an optional conversion process. For example, a conversion module 204 can obtain a source CAD file 202 having a first format, and can convert the source CAD file 202 to the CAD file 206, which has a second, different format. The conversion process can result in the CAD file 206 having properties conducive to subsequent image generation. For example, in some implementations, the source CAD file 202 represents curved surfaces of the training component, and the CAD file 206 represents the training component using a mesh. For example, the source CAD file 202 can be a .stp file, and the CAD file 206 can be a .stl file. The mesh representation of the training component can, in some implementations, be more-readily processed to generate images, e.g., by adding textures and backgrounds. For example, the computational resources used for the processing may be less than for curved-surface representations of the training component.

Figure 3A:
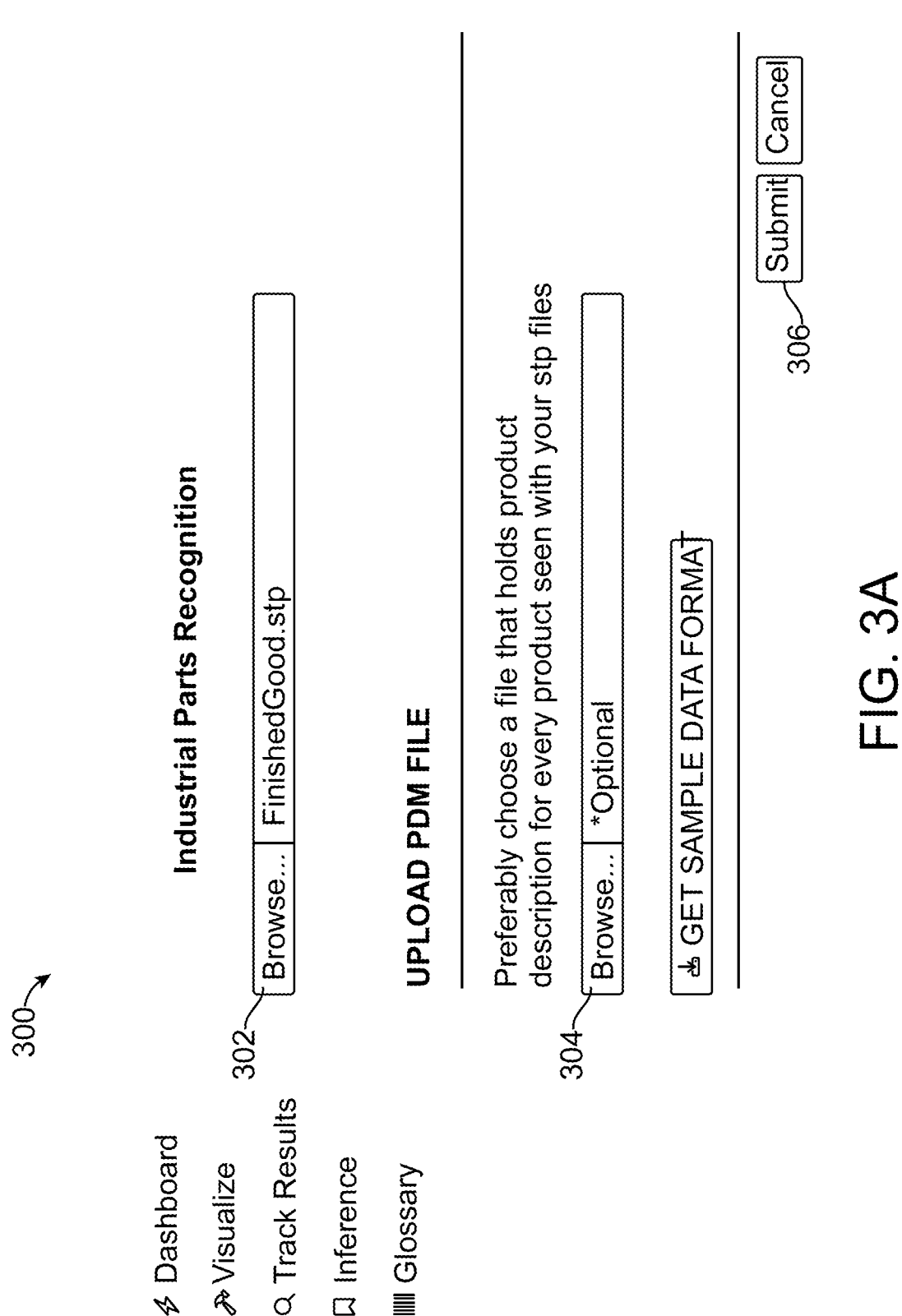

In some implementations, the CAD file 206 is obtained at a computer system remote from a mobile device or other computing device that provides the CAD file 206. For example, FIG. 3A shows an example of a user interface 300 that can be provided on a computing device to facilitate CAD file upload to the remote computer system. The user interface 300 includes an element 302 that, when selected, triggers opening of a dialogue box or other menu through which a CAD file (e.g., the source CAD file 202 or the CAD file 206) can be selected for upload. In this example, "FinishedGood.stp" has been selected as the source CAD file 202. The user interface 300 also includes an element 304 that can be optionally selected to upload an auxiliary file (e.g., a "product data masters" (PDM) file) that maps product/component identifiers (e.g., strings of digits) to descriptive names. Data from the auxiliary file can be used by the elements of the systems discussed herein, such as elements of systems 200, 700, to provide descriptive names when presenting results in user interfaces. Moreover, in some implementations, the auxiliary file is provided as input to a large language model that, based on the auxiliary file, learns to refer to components using their descriptive names.

The selection of element 306 can trigger upload of the selected file(s) and, in some implementations, trigger model training/re-training, as discussed in further detail below. The CAD file 206 can be sent to the remote computer system over a network connection, e.g., over the Internet.

The process 100 further includes generating a plurality of images of the training component based on the CAD file (104). The plurality of images differ from one another in at least one of orientation, background, or texture. For example, the image generation module 208 can obtain the CAD file 206 and generate images 210 based on the CAD file 206. The images 210 can have any suitable file format, such as .png, .jpg, or .png.

The images 210 depict the training component with one or more different image configurations and/or configurations of the training component, to provide a diverse set of training data for training a machine learning model 220 to identify the training component. The orientations of the images 210 can differ based on, for example, a (simulated/modeled) capture angle of the training component in the image. For example, the training component can be shown head-on, in a profile view, from above, at a tilted angle in one or more dimensions, etc., in various images of the images 210. The use of multiple orientations can train the machine learning model 220 to recognize the training component when imaged with diverse orientations. In some implementations, the multiple orientations include multiple zoom levels. The backgrounds of the images 210 can at least partially differ from one another and can include, for example, solid colors, patterns of multiple colors, and/or images, such as images of a floor, a table, a wall, a room, a warehouse, a job-site, etc. The background images can be chosen to represent typical locations at which component identification will take place, so that the machine learning model 220 can learn using training data similar to its inputs when deployed. The varying texture of the training component can include, for example, color (e.g., to represent different paints on the training component), glossiness, surface finish, shadow, lighting direction, glare, and/or any other surface effect that may be present in real-world images of the training component, to enhance the reliability of the machine learning model 220 at identifying the training component in real-world images. For example, shiny gold and silver textures can be used to emulate industrial machined components.

To obtain real-world images of the component with a diverse range of orientations, backgrounds, and textures may be cost-prohibitive. However, generating such images from a CAD file can be done digitally and at large scale (e.g., generating many images 210) relatively efficiently, to provide a more reliable and accurate machine learning model 220.

Figure 5:
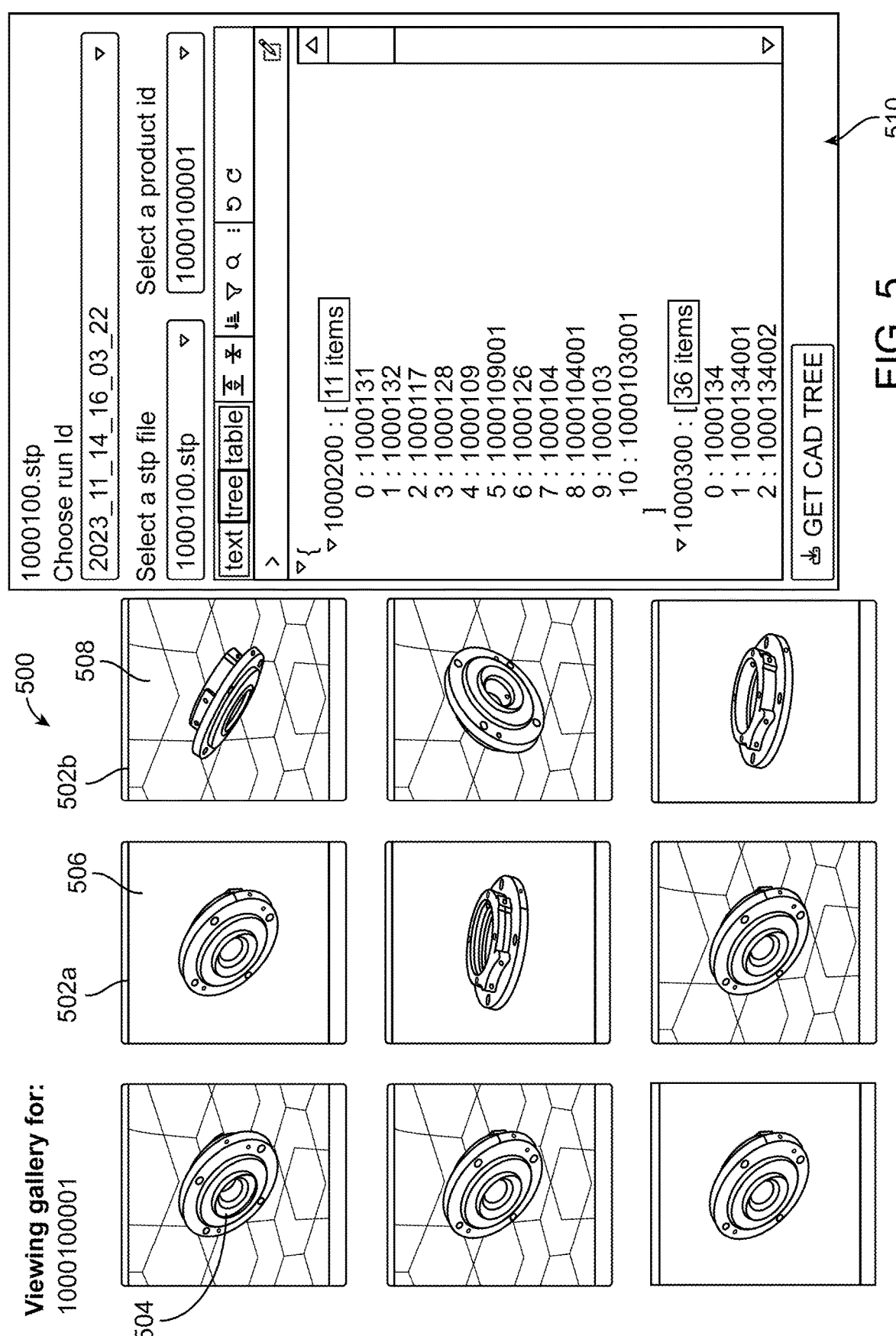
FIG. 5 is an example of a user interface.

FIG. 5 illustrates a user interface 500 that displays examples of generated images (e.g., images 502a, 502b) depicting a component 504. In this example, the images are generated based on a CAD file "1000100.stp" representing a component "1000100" that includes multiple sub-components, including the depicted component "1000100001," a washer. As shown in FIG. 5, the images differ from one another in orientation, component 504 texture, and/or background. For example, image 502a includes a solid background 506, while image 502b includes a tiled background 508. The user interface 500 can be presented on a mobile device or other computing device after upload of a CAD file for training. For example, the user interface 500 can be presented after a user selects elements 306 of FIG. 3 to upload a CAD file and after images have been generated based on the uploaded CAD file. The user interface 500 further includes a hierarchy display area 510, discussed in further detail below with respect to the similar component detection module 708.

The generated images 210 can be generated using one or more suitable programs, software, and/or other methods for generating images from CAD files. For example, in some implementations, the image generation module 208 executes an OpenCV program to generate the images 210. Further details on image generation are provided below with respect to FIG. 4.

The process 100 further includes determining locations of the training component in the plurality of images (106). For example, the location determination module 214 can obtain the images 210 and determine locations of the training component in the images 210. In some implementations, the location determination module 214, instead of or in addition to processing the images 210 to determine the locations, processes other images, e.g., one or more intermediately-generated images, as discussed in reference to FIG. 4. To train the machine learning model 220 as an object detection model, training data for the machine learning model 220 can include a location (e.g., a bounding shape, such as a bounding box) of the training component in the images 210 used for training, so that the machine learning model 220 is trained to identify the locations of test components in real-world photographs of the test components.

In some implementations, the locations of the training component are determined directly based on the generation of the images 210. For example, the image generation module 208 can execute a program to generate the images 210 with the training component have certain rendered coordinates, and the rendered coordinates of the training component can be inputs to the program, such that the locations of the training component are directly known by the location determination module 214.

Figure 4:
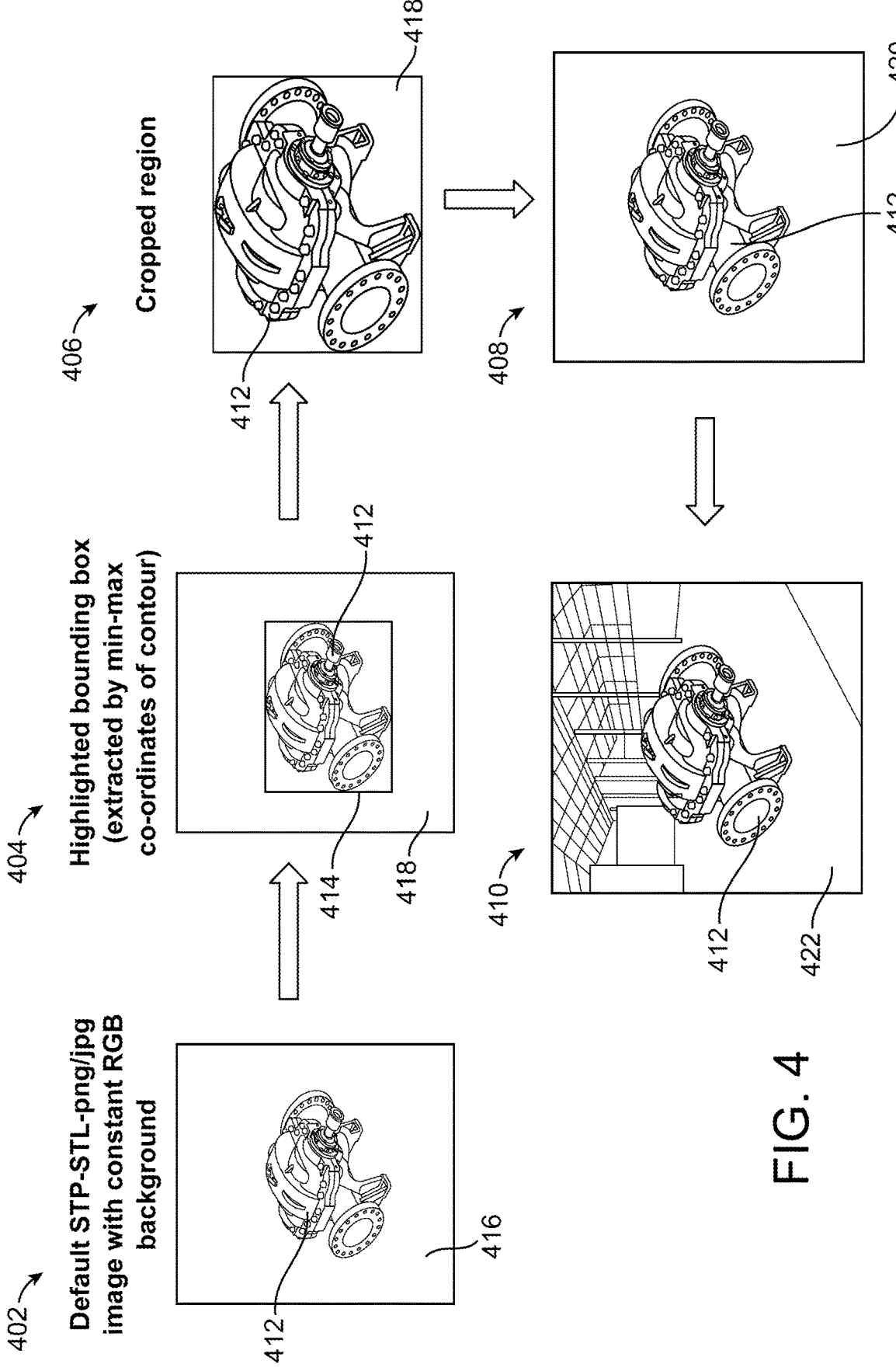
FIG. 4 is a diagram illustrating an example of image generation.

In some implementations, the locations of the training component are determined using image processing. For example, FIG. 4 shows an example of a series of images of a component 412 that can be generated in sequence for image generation (104) and location determination (106) for a corresponding one of the images 210. A first image 402 is generated by the image generation module 208 from the CAD file 206, e.g., directly from the CAD file 206 (e.g., a .stl file) using a suitable program or utility such as OpenCV. The first image 402 has a constant RGB background 416, e.g., a single-color background; the background 416 can be set as a configurable parameter of image generation. In some implementations, the component 412 and the background 416 in the first image 402 may (though need not) include color. In some implementations, the component 412 and the background 416 in the first image 402 are generated to be grayscale. The component 412 in the first image 402 can have a texture different from textures of the component 412 in other images of the multiple images 210, and/or the texture can be added in a later image.

The component 412 in the first image 402 can have an orientation different from orientations of the component 412 in other images of the multiple images 210. In some implementations, the orientations of the component 412 in the multiple images 210 follow a pattern of permutation across sets of values (e.g., angles). For example, the component 412 in each image 210 can have an angular orientation {x, y, z}, and x, y, and z can be permuted over a set of angles such as [30, 45, 55, 65, 70, 90] so that each combination of x, y, and z having any of those angles is included.

A second image 404 (which is included for purposes of explanation and which need not be generated by the image generation module 208 in practice) includes a bounding box 414. The image generation module 208 and/or the location determination module 214 can be configured to determine the bounding box 414. In this example, the bounding box 414 is a rectangle, e.g., for compatibility with the training of an object detection model as the machine learning model 220. However, other bounding shapes can instead or additionally be used.

In some implementations, the bounding box 414 is determined using a contour method. A contour is a curve joining continuous points (along a boundary) having a same color or intensity. As such, when the background 418 of the second image 404 is a single, solid color, a contour of that color will define (e.g., surround) the component 412. For example, the bounding box 414 can be defined using minimum and maximum coordinates of the contour in multiple dimensions. For example, when each point of the contour corresponding to the background 418 has coordinates (x, y), the four sides of the bounding box 414 can be determined to have values $x=x_{min}$, $x=x_{max}$, $y=y_{min}$, and $y=y_{max}$, where "min" and "max" refer to minimum and maximum x and y values for the contour, respectively.

The second image 404 can be a grayscale image, e.g., the component 412 can be rendered in grayscale (or converted into grayscale from a non-grayscale version in the first image 402), and the background 418 can be grayscale (e.g., rendered in grayscale directly or converted into grayscale from a non-grayscale background 416 in the first image 402). The use of a grayscale image for bounding box determination can improve the accuracy of the bounding box 414 in bounding the component 412, because the grayscale coloration can help isolate the component 412 from the background 418. For example, a filtering process can be applied to the second image 404 to filter out a range of RGB values. The range of color values (e.g., RGB values) can include the color of the background, which can be a single, constant color as described above. Accordingly, the background can be effectively removed from the image (e.g., for purposes of contour determination), and/or the contour can be determined based on the filter. The use of the filter ensures a clear separation between the component 412 and the background 418.

A third image 406 is cropped to the component 412, e.g., is the second image 404 cropped on the bounding box 414. Cropping the image can remove extraneous information that may slow future processing, and can be a useful pre-processing step for adding a background. The third image 406 need not be generated in practice but, rather, is shown to illustrate the cropping process. Cropping is an optional process that can be omitted in some implementations.

In a fourth image 408 (which need not be (though can be) generated in practice but which is included here to illustrate background replacement), the background 420 is assigned a constant RGB value. In this example, the background 420 is made solid black, but any data value(s) that indicate the portions of the image that can be fully transparent can be used.

In a fifth image 410 (which can be used as training data as one of the images 210), the solid color background 420 is replaced with a final background 422. In this example, the final background 422 is a warehouse image, e.g., to train the machine learning model 220 to identify the component 412 in images captured in a warehouse. For example, the image generation module 208 can perform a merge-replace operation to replace the constant RGB value of the background 420 of the fourth image 408 with the final background 422. The final background 422 need not be grayscale but, rather, can include color. Moreover, the component 412 in the fifth image 410 can be colored and/or can have a texture that varies across different images of the images 210. The location of the component 412 in the fifth image 410 can be determined by the location determination module 214 based on the bounding box 414. The location of the component 412 in the fifth image 410 can include a bounding box (not shown) of the component 412 in the fifth image. The location of the component 412 in the fifth image 410 can be a label for model training, as discussed below in reference to the training module 216.

The use of images derived from a CAD file (as shown, for example, in FIG. 4) allows locations of the training component to be determined precisely in many images 210 (e.g., hundreds, thousands, or more) that include the training component. For example, because the images are generated from a CAD file, the backgrounds of the images can be set and modified precisely using software (e.g., as discussed in reference to FIG. 4), and these readily-adjustable, pre-determined backgrounds are conducive to location determination, e.g., bounding box determination, with relatively low computational cost. By contrast, labeling real-world photographs with component locations may require costly and time-consuming manual labeling, and/or an automated labeling process that (i) is prone to errors because it operates on real-world photographs and (ii) is computationally intensive. Accordingly, generating image training data from a CAD file, as described herein, can significantly reduce the computational resources associated with model training.

Referring again to FIG. 1, a machine learning model is trained to detect the training component in photographs captured by mobile devices (108). For example, the machine learning model 220 can be trained by the training module 216. The training can use, as training data, the plurality of generated images and the locations of the training component in the plurality of generated images. For example, the training module 216 can receive, as training data, (i) the images 210 and (ii) as labels for the images 210, corresponding locations (e.g., bounding boxes) of the training component in the images 210. Accordingly, the machine learning model 220 can be trained as an object detection model to identify the training component in photographs and to output locations of the training component in the photographs. "Photographs" is used herein to denote that the machine learning model is trained to identify the training component in "real world" images captured using a camera, e.g., as opposed to the images 210, which may be (though need not be) entirely computer-generated based on the CAD file 206. The machine learning model 220 can be defined by a set of stored parameters defining the machine learning model, e.g., stored at the remote computer system or elsewhere.

In some implementations, training the machine learning model (108) is a retraining operation. For example, the machine learning model 220 may be already trained using training data that does not include the training component, and the retraining can cause the machine learning model 220 to learn to identify the training component.

The process 100 relates to training the machine learning model 220 to identify a single training component. In practice, the images 210 can include images of many different training components, the images generated from CAD files representing the different training components. Accordingly, the machine learning model 220 can be trained to identify many different components.

In some implementations, real-time feedback can be provided to users to indicate a state of model training. For example, as shown in FIG. 3B, a user interface 350 presents information indicative of a state of training three models. Row 352 indicates that a first model is currently being trained. Row 354 indicates that training failed for a second model. Row 356 indicates that data is being prepared for training a third model, e.g., images are being generated from CAD files for use as training data. The user interface providing real-time feedback can be provided on the same computing device that presents the user interface 300 of FIG. 3A, e.g., the same computing device that uploads CAD files and triggers model training.

In some implementations, the process 100 includes operations to prevent too-similar images of a component from being included in the training data for the component provided to the training module 216. For example, if a component looks the same from the front and the back, then duplicate images may be included in the images 210 (neglecting differences in background and/or texture), because front and back views may both be represented among the different orientations of the images 210. This can be detrimental to machine learning model training, e.g., by over-weighting certain aspects of the component for object detection.

Accordingly, in some implementations, the system 200 includes the duplicate detection module 212. The duplicate detection module 212 is configured to receive the generated images 210 of the training component, and/or intermediately-generated images, and compare the images to one another to identify too-similar images. For example, in some implementations, the compared images of the component 212 are images that show the rendered component 212 with a varying orientation, but which do not include texture or background. For example, the images can be generated using Py Vista from a .stl file to plot a 3D mesh of the component 412 with various orientations, and those plotted images can be compared to one another. The duplicate detection module 212 can determine image-wise similarities between the images using one or more suitable graphical comparison methods, e.g., cosine similarity, structural similarity index measure (SSIM), and/or the like. The duplicate detection module 212 can use the similarities to determine which generated images of the training component should be included in training data and used to train the machine learning model 220. For example, in some implementations, if an image-to-image similarity between two images is above a threshold value (e.g., a 0.99 threshold for SSIM), the duplicate detection module 212 determines to only include one of the two images in the images used for training the machine learning model 200. For example, the images used for training can include images having the orientation of the training component in the first image, and exclude images having the orientation of the training component in the second image, because the two orientations result in duplicate or near-duplicate images. In response to the image-to-image similarities between an image and the other generated images being below the threshold value, the duplicate detection module 212 can determine to include the image, or derivations thereof, in the training data. For example, when the similarities are determined using images that do not include texture and/or background, the image generation module 208, based on the determination by the duplicate detection module 212, can generate various versions of the non-duplicate image having different textures and/or backgrounds and having the orientation of the non-duplicate image. The generated images having that orientation are then included in the images used for training.

Figure 6:
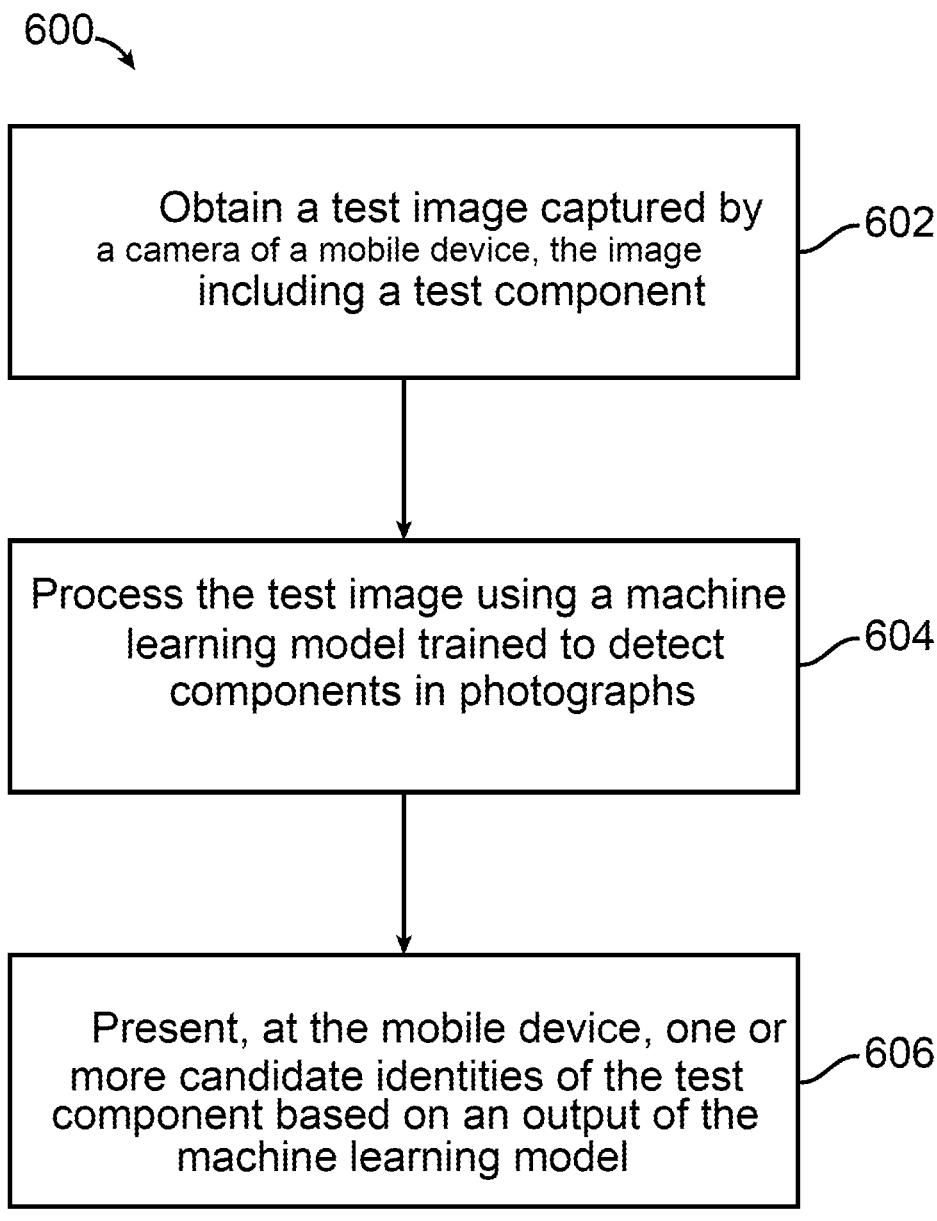
FIG. 6 is a diagram showing an example of candidate identity determination.
Figure 7:
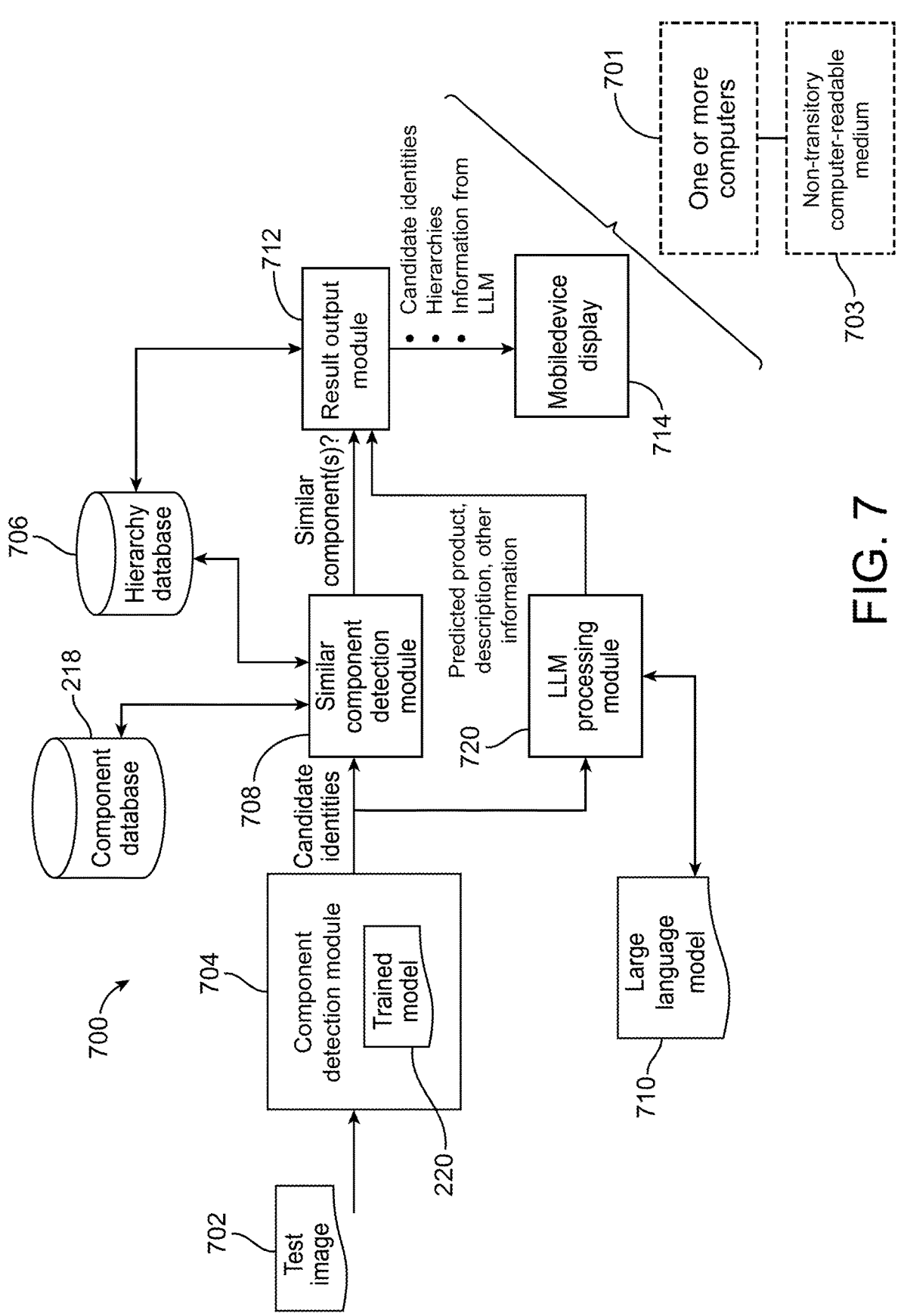
FIG. 7 is a diagram showing an example of a system associated with candidate identity determination.

The machine learning model 220, once trained, can be used for inference to detect the training component (and other training components) in captured images. For example, FIG. 6 illustrates an example of a process 600 for identifying a test component. FIG. 7 shows an example of a system 700 associated with process 600. For example, elements of the system 700 can be configured to perform process 600 to identify a photographed test component. For example, the system 700 can include one or more computers 701 (e.g., a data processing apparatus) and a non-transitory computer-readable medium 703 tangibly encoding a computer program operable to cause the one or more computers 701 to perform process 600 and/or associated operations described herein. The one or more computers 701 and/or the non-transitory computer-readable medium 703 can implement at least some or all of the modules of FIG. 7.

The system 700 includes a component detection module 704 that includes (or has access to) the trained machine learning model 220, a similar component detection module 708, a large language model (LLM) 710, an LLM processing module 720, a hierarchy database 706, a result output module 712, and a mobile device display 714. The modules 704, 708, 712, 720 can be hardware and/or software modules, e.g., implemented by one or more computer systems. For example, the modules 704, 708, 712, 720 can include one or more hardware processors and one or more computer-readable mediums encoding instructions that, when executed by the one or more hardware processors, cause the one or more hardware processors to perform operations such as portions of process 600 and/or other processes described herein. The modules 704, 708, 712, 720 can be software modules executed by one or more hardware processors based on instructions encoded in one or more computer-readable mediums. In some implementations, the mobile device display 714 is a display of a mobile device, and the component detection module 704, the similar component detection module 708, and the LLM 710 are implemented in a computer system remote from the mobile device, e.g., a cloud computing system or server system. As such, more computationally-intensive processes can be performed on the remote computer system, while results can be provided on the mobile device.

The modules 704, 708, 712, 720 need not be separate but, rather, can be at least partially integrated together as one or more combined modules or fully integrated together as a single program. The modules 704, 708, 712, 720 can be modules of a remote computer system. In some implementations, the result output module 712 is a module of a mobile device. The hierarchy database 706 can include any one or more storages, such as a cloud storage system. The LLM 710 can be defined by a set of stored parameters defining a machine learning model, e.g., stored at the remote computer system or elsewhere.

Referring to FIG. 6, the process 600 includes obtaining a test image (e.g., a photograph) captured by a camera of a mobile device (602). The test image includes a test component. For example, the test component can be a component that a user would like to identify, e.g., in order to place an order for the test component or to access support materials for the test component. In some implementations, as discussed in further detail below, the test image includes multiple test components, and the machine learning model 220, trained as an object detection model, can detect locations of, and identify, each of the multiple test components. In some implementations, the test image was previously captured and stored, such that the test image is uploaded from a storage.

Figure 9:
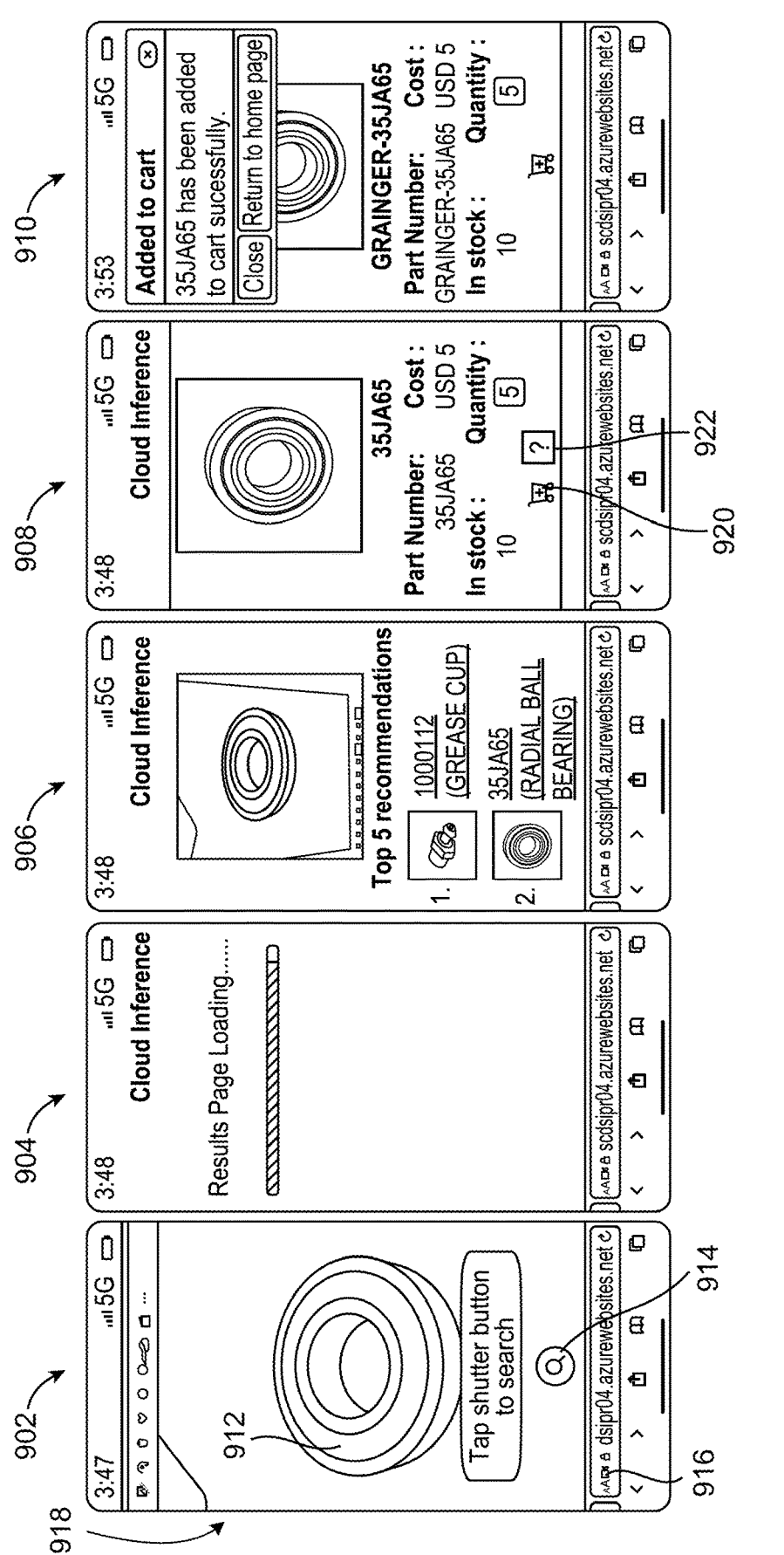

FIG. 9 illustrates an example of a user interface 902 that can be presented on a display of the mobile device. The user interface 902 includes an image display 918 that can be, for example, a live feed corresponding to image capture by the camera of the mobile device or a previously-captured image that can be opened in the user interface 902 (e.g., using a file browser or image browser). A test component 912 is present in the image display 918. The user interface 902 further includes an element 914 that, when selected, triggers upload of the image in the image display 918 to a remote computer system for processing according the process 600. In some implementations, selection of the element 914 or another element triggers capture of the image, e.g., such that image capture can be performed directly in an application providing the user interface 902.

In some implementations, the application providing the user interface 902 and/or other user interfaces described herein is a web application, e.g., an application accessible in a web browser. For example, the user interface 902 presents a URL 916 at which the web application can be accessed. In some implementations, the user interface 902 is accessed through a mobile application, e.g., an application installed on the mobile device.

As shown in FIG. 7, the component detection module 704 can receive a test image 702. For example, the test image 702 can be captured at a mobile device and provided to the component detection module 704 over a network connection with the mobile device, e.g., over the Internet.

The test image is processed using a machine learning model trained to detect components in photographs (604). For example, the machine learning model can be the machine learning model 220 trained as described with respect to FIGS. 1-5. The component detection module 704 provides, as output, one or more candidate identities of the test component. For example, in some implementations, the machine learning model 220 outputs, for each of one or more components that the machine learning model 220 was trained to detect, a score indicative of a likelihood that the test component is the component. For example, a higher score can correspond to a higher probability of detection of the component in the test image 702. In some implementations, the score is based on a multi-class cross entropy function which presents the probability scores for each detection category (corresponding to different components). In some implementations, the component detection module 704 outputs a subset of candidate identities that the machine learning model 220 is trained to detect. For example, the component detection module 704 can output the n highest-scoring (most-likely-detected) candidate identities, where n is an integer greater than or equal to 1.

In some implementations, the machine learning model 220 can detect multiple components in the test image, e.g., based on the machine learning model 220 being an object detection model. One or more candidate identities can be determined for each of the multiple components, and the model output corresponding to each of the multiple components can be processed as described herein in reference to a single component, e.g., checking for similar other components in the candidate identities, determining and presenting a product hierarchy, providing the model output as input to a large language model, etc.

In some implementations, the candidate identities output by the component detection module 704 are processed by an optional similar component detection module 708. The similar component detection module 708 can perform a comparison process between output candidate identities to remove duplicates or near-duplicates which may be present. For example, respective components having two candidate identities may be included in two products, such that the components may be classified separately (e.g., the machine learning model 220 can be trained to detect the components as distinct components) even if the components themselves are identical or very similar. The similar component detection module 708 can detect occurrences of duplicates or near-duplicates in the output candidate identities and can cause only a single one of the duplicates or near-duplicates to be presented to a user, to reduce user confusion and improve the user experience.

For example, a user may wish to identify a washer in order to order replacements. The washer may be included in a first product, and a very similar washer may be included in a second product, and/or the washer may be included in a first module of a product (e.g., a front assembly), and a very similar washer may be included in a second module of the product (e.g., a rear assembly). However, the user may be unconcerned with the exact product hierarchy of the washer, desiring simply to order a suitable washer, which could be the washer in the first product or the second product, or the washer in the first module or the second module. The similar component detection module 708 can cause only a single one of the washers to be displayed to simplify the user experience.

In some implementations the similar component detection module 708 processes the candidate identities based on respective product hierarchies for the candidate identities. A product hierarchy indicates a relationship between each component and (i) any sub-components included in the component and (ii) any parent components in which the component is included. Examples of at least partial product hierarchies are shown in the hierarchy display area 510 in FIG. 5. For example, component "1000100001" is included in a component (here, a product) "1000100" represented by a .stp file "1000100.stp." Component "1000100" includes, as sub-components, component "1000200" and component "1000300." Component "1000200" includes, as a sub-component, component "1000131," and component "1000300" includes, as a sub-component, component "1000134."

It may be the case that respective sub-components of component "1000200" and component "1000300" are very similar to one another. For example, component "1000200" and component "1000300" may be a front assembly and a rear assembly, respectively, and component "1000131" and component "1000134" may be screws included in the front assembly and the rear assembly, respectively. The components 1000131" and "1000134" may be very similar or identical, classified as different components primarily because they are included in different assemblies; however, either component "1000131" or "1000134" can be used in place of the other without negative effects.

Product hierarchies can be included in CAD files uploaded for image generation and training. For example, the product hierarchy shown in FIG. 5 is included as data in the file "1000100.stp". The product hierarchy can be extracted from an uploaded CAD file by one or more modules and stored for subsequent use. For example, the image generation module 208 or another module can store the product hierarchy in the hierarchy database 706, and the similar component detection module 708 can access the product hierarchy from the hierarchy database 706.

The similar component detection module 708 can be configured to determine graphical similarities between images of different components included in the output candidate identities. For example, for one or more pairs of the components included in the candidate identities, the similar component detection module 708 can (i) obtain product hierarchies of the components from the hierarchy database, (ii) determine whether the two components are included in separate products or in separate modules/parts of a common product, (iii) obtain one or more images of the components (e.g., from a component database 218 storing previously-generated images of components and, in some implementations, other information such as CAD files for the components), and (iv) determine similarities between the one or more images of the different components. Image similarity can be determined as described with respect to the duplicate detection module 212. If the images of the two components are sufficiently similar (e.g., an aggregate similarity measure is at least a threshold value) and the two components are included in separate products or separate parts of a common product, the similar component detection module 708 can cause (in some implementations) only one of the two components to be included as a candidate identity presented to a user. For example, the similar component detection module 708 can remove one of the candidate identities from a set of candidate identities provided to a result output module 712 for display.

Figure 8:
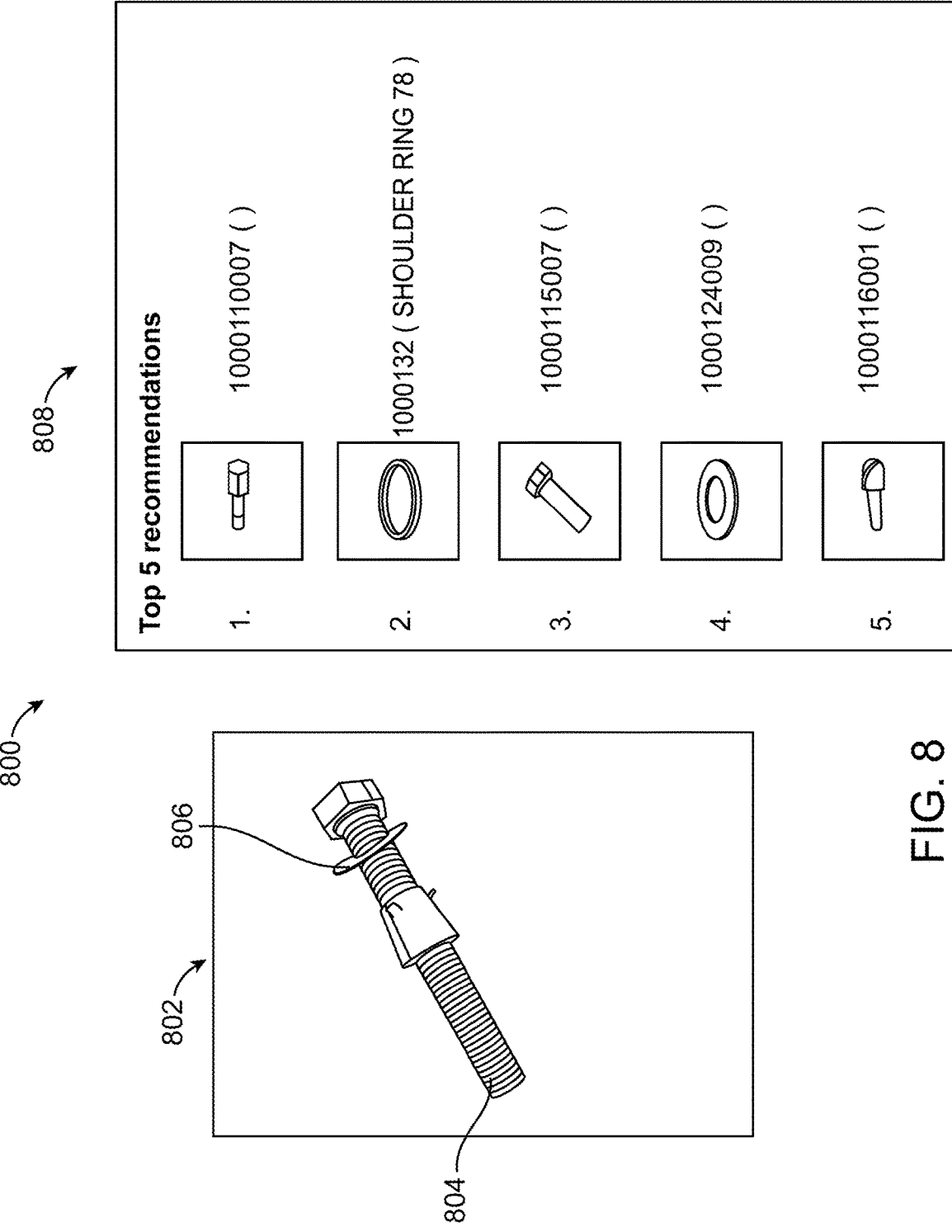
FIGS. 8-9 are examples of user interfaces.

For example, in the example of FIG. 5, even if both components "1000131" and "1000134" are identified as candidate identities of the test component, the similar component detection module 708 may cause only one of the components to appear in a result list provided to a user (e.g., a result list as shown in FIG. 8).

In addition, in some implementations, a large language model (LLM) 710 is trained using CAD files. The LLM 710 can then be used to provide information about components corresponding to candidate identities, e.g., product hierarchy information, component names, component descriptions, and/or other information. The LLM 710 can be trained and executed on a remote computer system, such that the significant processing resources used for training and execution are not an impediment to its use.

Figure 10:
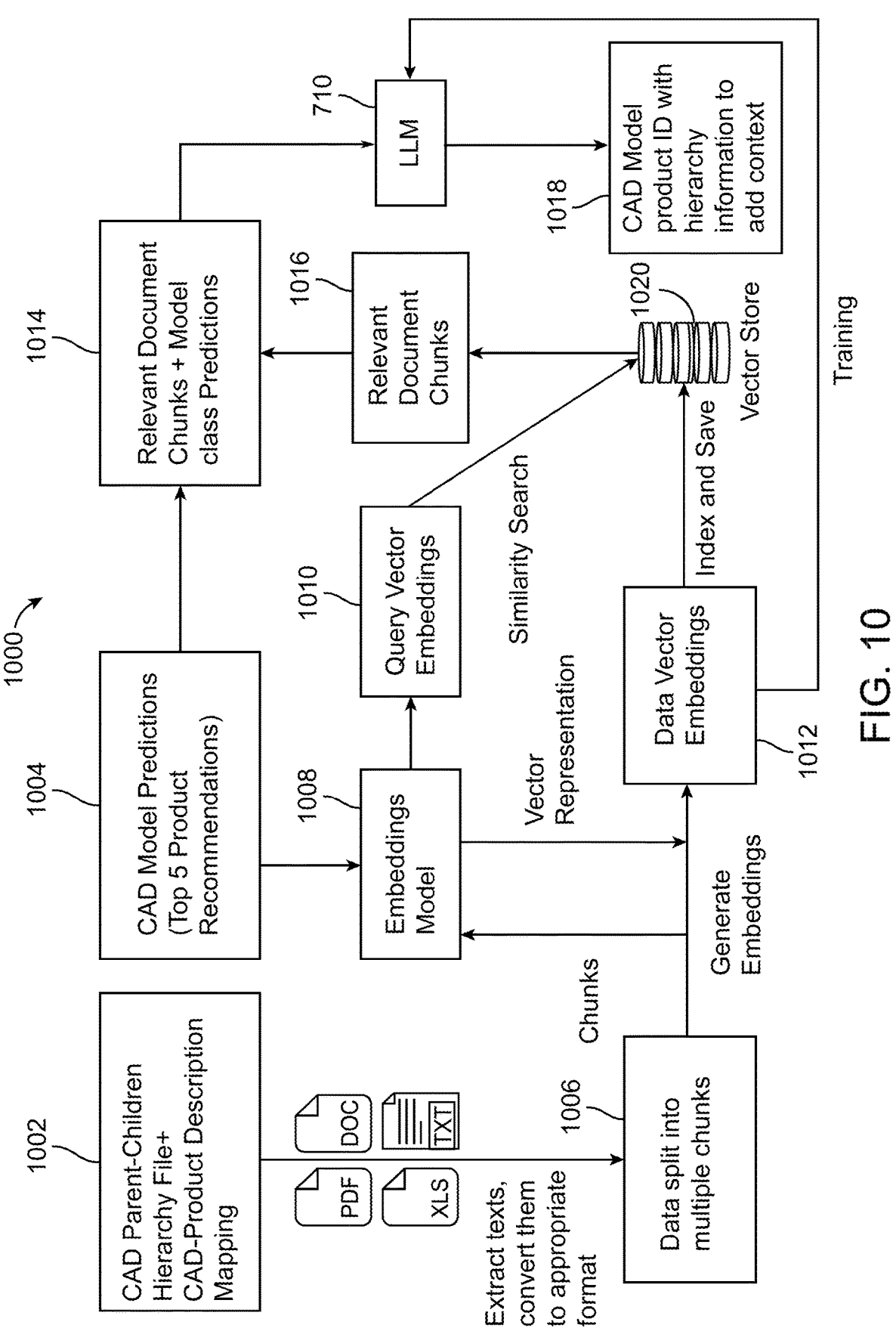
FIG. 10 is a diagram showing an example of a workflow associated with a large language model.

For example, FIG. 10 illustrates an example of a workflow 1000 for training the LLM 710 and using the trained LLM 710. Operations of the workflow 1000 can be performed, for example, by the LLM processing module 720. The workflow 1000 leverages product files 1002, which can include CAD Parent-Children Hierarchy files and/or CAD Product Description Mapping files. The CAD Parent-Children Hierarchy files 1002 include product hierarchies for a given product or component, while the CAD Product Description Mapping files 1002 include mappings between products and corresponding descriptions of the products. For example, a CAD Product Description Mapping file for a component "12345" can include a mapping between "12345" and "helical gear." The product files 1002 can be included in CAD files, e.g., CAD files 202 or 206 uploaded to a remote computer system. As such, the product files 1002 can be extracted and used for LLM training as discussed herein. The product files 1002 can have various forms, such as .pdf, .doc, .xls, and/or .txt as illustrated in FIG. 10. In some implementations, the product files 1002 include an auxiliary file that maps component identifiers to descriptive names, such that the LLM 710 is trained to refer to components using their descriptive names and not merely identifying numbers.

Data in the product files 1002 is split into multiple chunks (1006). For example, the data can be broken up into multiple segments based on one or more criteria. For example, in some implementations each chunk corresponds to a single product hierarchy (e.g., for a CAD Parent-Children Hierarchy file 1002) or a single product description (e.g., for a CAD Product Description Mapping file 1002). The split-up data can be more easily processed for LLM training. In some implementations, each chunk is based on a pre-defined chunk length, e.g., 500-1000 characters, and a chunk overlap size, either or both of which can be used as a model hyper parameter for fine-tuning the LLM 710.

An embeddings model 1008 obtains the chunks as input and produces vector representations (data vector embeddings 1012) of the chunks, represented in FIG. 10 by conversion of the chunks to the data vector embeddings 1016. For example, each chunk, and in some implementations elements of the chunks (e.g., individual words, product/component identifiers, hierarchy data elements, etc.) is assigned a vector in a high-dimensional space. In some implementations, a pre-trained transformer model is used as the embeddings model 1008, e.g., an all-MiniLM-L6-v2 model which embeds text of the product files 1002 into a 384-dimensional dense vector space. The data vector embeddings 1012 can be indexed and stored in a vector store 1020.

The data vector embeddings 1012 are used to train the LLM 710. The trained LLM 710 is capable of receiving natural-language inputs about the data in the product files 1002 and providing natural-language responses about the data in the product files 1002. In some implementations, the LLM 710 is trained using open-source tools, such as Lang-Chain. In some implementations, the LLM 710 is based on other data in addition to the data in the product files 1002. The other data can provide the LLM with capabilities such as conversational capabilities. For example, in some implementations, the LLM 710 is trained using a publicly-available instruction dataset, e.g., Llama-2-7b-chat. As such, the LLM 710 can be trained to converse in a chat dialogue about the content of the product files 1002.

After component inference (e.g., after processing the test image using the machine learning model 220 (604)), the one or more candidate identities can be provided to the LLM 710, e.g., by the LLM processing module 720. For example, as shown in FIG. 10, the top five model predictions 1004 (e.g., the products and/or components having the highest likelihood of detection as determined by the machine learning model 220) can be obtained and processed before being provided to the LLM 710. In this example, the model predictions 1004 (e.g., in the form of component identifiers and/or descriptive names corresponding to each identified candidate identity) are provided as inputs to the embeddings model 1008, which generates query vector embeddings 1010 of the model predictions 1004, e.g., in the same vector space as the data vector embeddings 1012.

A similarity search is performed between the query vector embeddings 1010 and the stored data vector embeddings 1012 in the vector store 1020. The similarity search identifies relevant document chunks 1016 of the product files 1002, e.g., based on vector-wise comparisons between the query vector embeddings 1010 and the data vector embeddings 1012. For example, the most-similar chunks to the model predictions 1004 (in the high-dimensional vector space embedding) can be selected as the relevant document chunks 1016. The similarity search can be performed using one or more suitable tools, such as Facebook AI Similarity Search (FAISS). The inclusion of the relevant document chunks 1016 allows the model predictions 1004 to be related to the existing vector embeddings for the LLM 710, such that the LLM 710 can provide custom context for each response.

The relevant document chunks 1016 and the model predictions 1004 can be used as input data 1014 provided as input to the LLM 710. In some implementations, the input data 1014 is provided along with a prompt for ensuring useful data output. For example, the input data 1014 can be provided along with a predetermined prompt such as "what are descriptions for each of these components, and what product(s) is each component included in?" In the case of a user-provided input to the LLM 710 (e.g., in the context of a chat dialogue), a user-provided prompt can be provided along the input data 1014.

The LLM 710 generates an output 1018 based on the input data 1014 and any other input. In the example of FIG. 10, the output 1018 includes CAD model product identifiers for the components of the model predictions 1004, along with hierarchy information providing context for the model predictions 1004. For example, the hierarchy information can include a product in which each identified component is included. Based on its training using CAD files, the LLM 710 can generate (as output 1018) hierarchies for parts all the way up to top-level assemblies/equipment.

In some implementations, the input data 1014 relates to multiple different components in the test image, and the LLM 710, based on its training using CAD files, can make appropriate inferences about the relationships between the components. For example, if the test image includes an assembly having multiple different components (e.g., a shaft, sleeves, nuts, bolts, etc.), the LLM 710 can identify leaf items present in the test image and associate them with appropriate parent item(s), given the context of the other component(s) present in the test image. For example, if the machine learning model 220 detects a nut, the LLM 710 can provide, as output 1018, "nut detected in the shaft-sleeve assembly."

Other outputs 1018 are also within the scope of this disclosure and can be generated based on the input data 1014 and any prompts provided as input to the LLM 710. For example, the LLM 710 is generally trained on CAD files and so, in some implementations, is capable of responding to various queries about the CAD files, such as which components are included in a given product, dimension information for components, how components are attached to one another, etc. This information can be obtained by providing an appropriate prompt to the LLM 710.

In some implementations, a user interface is provided through which a user (e.g., using a mobile device) can interact with the LLM 710 in a chat dialogue. For example, the user can input "what is parent and description of 1000122?" That prompt is provided as input to the LLM 710. Based on the LLM's 710 training on CAD file(s) that include hierarchy information for and a description of component "1000122," the LLM 710 can provide an output (answer) of "1000122 is an O RING 255, which is a child of 1000200 (IMPELLER)." This output can be displayed on a mobile device or other computing device.

Referring again to FIGS. 6-7, in the process 600, the one or more candidate identities of the test component are presented at the mobile device based on an output of the machine learning model (606). For example, a result output module 712 obtains the one or more candidate identities and causes presentation of the candidate identities on the mobile device display 714. The result output module 712 can be a module of the mobile device that receives, over a network, outputs of the trained machine learning model 220 (or information derived therefrom) from the remote computer system executing the trained machine learning model 220, the similar component detection module 708, the LLM 710, etc., and/or the result output module 712 can be a module of the remote computer system which sends instructions to the mobile device to cause display on the mobile device display 714.

As shown in FIG. 8, an example of a user interface 800 that can be presented on the mobile device display 714 by the result output module 712 includes a test image 802 (e.g., captured by a camera of the mobile device). The test image 802 includes both a screw 804 and a washer 806. The screw 804 and the washer 806 can be independently detected and processed by the machine learning model 220. Accordingly, a result list 808 includes candidate identities for both the screw 804 (e.g., components 1000110007 and 1000115007) and the washer 806 (e.g., components 1000132 and 1000124009). In this example, component 1000132 is identified not only by its identifying number but also by a description/name "shoulder ring 78," e.g., based on an auxiliary file as discussed in reference to FIG. 3.

The result output module 712 can further access the hierarchy database 706 and/or receive outputs from the similar component detection module 708 and/or the LLM 710, and display corresponding data on the mobile device display. For example, the result output module 712 can obtain one or more product hierarchies of one of more of the components of the candidate identities, and can present the one or more product hierarchies; can selectively present or not present each candidate identity based on an output of the similar component detection module 708, to avoid presentation of too-similar components; and/or can obtain and present an output 1018 of the LLM 710, e.g., hierarchy information for one or more of the candidate identities, a description of one or more of the candidate identities and/or a product in which the candidate identities are included, and/or other LLM-output information.

Referring again to FIG. 9, after a user provides the test image to a remote computer system using user interface 902, user interface 904 can be displayed while the remote computer system performs operations to determine candidate identities and other relevant information. The mobile device can receive the candidate identities and other relevant information and display them in a user interface 906. In this example, the user interface 906 displays the top five most-likely identities for the test component 912. Each candidate identity is also labeled with a descriptor (e.g., "GREASE CUP"), e.g., based on an auxiliary file that maps identifiers to descriptors.

In some implementations, a user can select one of the candidate identities using the user interface 906 to be provided with a purchase interface, such as user interface 908, which can be used to purchase one of the components having one of the candidate identities. For example, a user can select element 920 to purchase the second-most-likely component "35JA65," as reflected in user interface 910.

In some implementations, the LLM 710 or a different LLM is trained using, as input data, documents providing information about components. The documents can include, for example, training documentation, support documentation, datasheets, articles, etc., and can be processed as described with respect to the product files 1002. As such, the LLM 710 or a different LLM can be trained to respond to user queries regarding the operation, function, and other characteristics of components determined as candidate identities and/or other components. For example, the LLM processing module 720 can be configured to access the LLM 710 or the different LLM and provide, as input, the model predictions 1004 processed as described with respect to FIG. 10. The LLM 710 or the different LLM trained using the above-described documentation can then provide, as output 1018, support information (e.g., a tutorial) for each identified component determined as a candidate identity. For example, user interface 908 can include an element 922 that, when selected, triggers display of the tutorial or other support information generated by the LLM 710 or the different LLM. In the example of FIG. 9, the tutorial can include, for example, comments on proper use of the radial ball bearing "35JA65," a comparison between the radial ball bearing "35JA65" and alternative ball bearings, specifications for the radial ball bearing "35JA65" (e.g., dimensions, material, etc.), and/or the like. This and other tutorial information can be presented in the context of a chat dialogue in which the user can ask specific questions and receive customized answers.

Figures 11, 12:
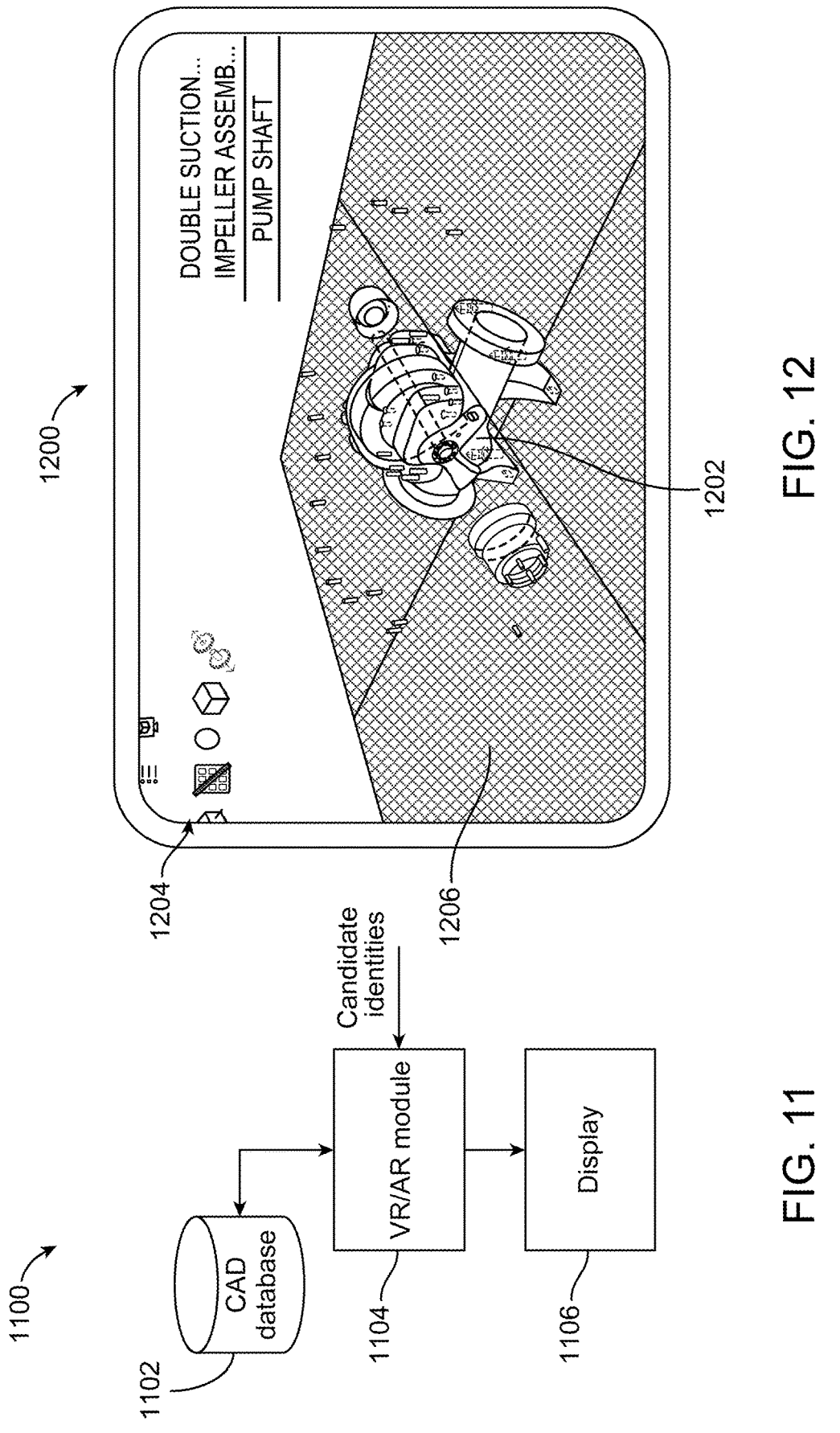
FIG. 11 is a diagram showing an example of a system associated with virtual reality/augmented reality display.
FIG. 12 illustrates an example of a VR/AR user interface.

In some implementations, the result output module 712 or another module is configured to provide a virtual reality (VR) and/or augmented reality (AR) experience. For example, as shown in FIG. 11, a system 1100 includes a CAD database 1102 that stores CAD files (e.g., CAD files of components included in the component database 218), a VR/AR module 1104, and a display 1106, e.g., a display of a device compatible with VR/AR display, such as a mobile device, a wearable device, a VR/AR headset, or another type of device. In some implementations, the CAD database 1102 is the component database 218. The VR/AR module 1104 can have characteristics as described for the modules of systems 200, 700. In some implementations, the VR/AR module 1104 is a module of a local device, e.g., the device compatible with VR/AR display that includes the display 1106. In some implementations, the VR/AR module 1104 is remote from the device compatible with VR/AR display and provides display data to the device compatible with VR/AR display for display, e.g., by sending streaming video for display.

The VR/AR module 1104 is configured to obtain the one or more candidate identities determined in the process 600. For example, the VR/AR module 1104 can obtain the candidate identities from the result output module 712. The VR/AR module 1104 accesses the CAD database 1102 and obtains CAD files of at least one of the components having the candidate identities. For example, in the case of FIG. 9, the VR/AR module 1104 can obtain CAD files of one or both of the components "1000112" and "35JA65."

The VR/AR module 1104 can present, on the display 1106 and using the CAD file(s), a VR/AR experience in which a user can interact with one or more of the components. For example, as shown in FIG. 12, a VR/AR user interface 1200 (in this case, displayed on a tablet) can include a model 1202 of a product including one or more of the components (or, in some implementations, a component itself). A user can interact with the model 1202, e.g., to rotate the model 1202, move components of the model 1202, zoom in/out, adjust attributes of at least one component, etc., using interface elements 1204 and/or gesture controls. As such, users can interact with identified components to gain a better understanding of their function. In some AR implementations, the model 1202 is overlaid or composited into a view of a physical environment. In the example of FIG. 12, the model 1202 is overlaid on a grid background 1206. The physical environment can include any real-world environment, e.g., an artificial environment or a natural environment.

Types of machine learning models within the scope of this disclosure (e.g., as the machine learning model 220 and the LLM 710) include, for example, machine learning models that implement supervised, semi-supervised, unsupervised and/or reinforcement learning; neural networks, including deep neural networks, autoencoders, convolution neural networks, multi-layer perceptron networks, and recurrent neural networks; classification models; large language models; and regression models. The machine learning models described herein can be configured with one or more approaches, such as back-propagation, gradient boosted trees, decision trees, support vector machines, reinforcement learning, partially observable Markov decision processes (POMDP), and/or table-based approximation, to provide several non-limiting examples. Based on the type of machine learning model, the training can include adjustment of one or more parameters. For example, in the case of a regression-based model, the training can include adjusting one or more coefficients of the regression so as to minimize a loss function such as a least-squares loss function. In the case of a neural network, the training can include adjusting weights, biases, number of epochs, batch size, number of layers, and/or number of nodes in each layer of the neural network, so as to minimize a loss function.

Because each machine learning model is defined by its parameters (e.g., coefficients, weights, layer count, etc.), and because the parameters are based on the training data used to train the model, machine learning models trained based on different data differ from one another structurally and provide different outputs. For example, because the machine learning model 220 is trained based on images generated from CAD files as discussed herein, the machine learning model 220 may provide more accurate component identifications, across a wider range of image capture conditions, than machine learning models trained without images generated from CAD files. As another example, because the LLM 710 is trained based on CAD files, the LLM 710 is structurally different from LLMs not trained on CAD files and is able to provide outputs that LLMs not trained on CAD files would not provide, given the same inputs.

Some features described herein, such as the systems 200, 700, 1100 and elements thereof, may be implemented in digital and/or analog electronic circuitry or in computer hardware, firmware, software, or in combinations of them. Some features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output, by discrete circuitry performing analog and/or digital circuit operations, or by a combination thereof.

Some described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java, Python, JavaScript, Swift), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks;

magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:

obtaining a test image captured by a camera of a mobile device, the test image including a test component;

processing the test image using a machine learning model, wherein the machine learning model has been trained by obtaining a three-dimensional (3D) model file representing a 3D model of a training component, generating a plurality of images of the training component based on the 3D model file representing the 3D model of the training component, wherein the plurality of images differ from one another in at least one of orientation, background, or texture, determining locations of the training component in each of the plurality of images, and training the machine learning model using, as training data, the plurality of images and the locations of the training component, wherein the machine learning model is trained to detect the training component in photographs captured by mobile devices; and presenting, at the mobile device, one or more candidate identities of the test component based on an output of the machine learning model, wherein presenting the one or more candidate identities comprises:

determining a similarity between an image of a first candidate component and an image of a second candidate component, and determining, based on the similarity and based on the first candidate component and the second candidate component being included in separate products, to present at the mobile device a first candidate identity corresponding to the first candidate component.

2. The method of claim 1, wherein determining the locations of the training component comprises determining bounding boxes of the training component based on known rendered coordinates of the training component in the plurality of images.

3. The method of claim 1, wherein determining the locations of the training component comprises:

converting the plurality of images to a grayscale format;

determining contours associated with backgrounds of the plurality of images in the grayscale format; and determining the locations of the training component based on the contours.

4. The method of claim 1, wherein the machine learning model has been trained by:

determining a second similarity between a first image of the training component and a second image of the training component, the training component having different orientations in the first image and the second image; and in response to the second similarity being above a threshold value, including an image derived from the first image in the plurality of images used to train the machine learning model, and excluding images derived from the second image from the plurality of images used to train the machine learning model.

5. The method of claim 1, wherein the machine learning model comprises an object detection model, wherein the test image includes a second test component, and wherein the method comprises presenting, at the mobile device, one or more candidate identities for each of the test component and the second test component based on the output of the machine learning model.

6. The method of claim 1, comprising:

obtaining a first 3D model file of the first candidate component corresponding to the first candidate identity, and a second 3D model file of the second candidate component corresponding to a second candidate identity; and determining, based on the first 3D model file and the second 3D model file, respective product hierarchies of the first candidate component and the second candidate component, the respective product hierarchies indicating that the first candidate component and the second candidate component are included in separate products; and determining, based on the similarity and based on the first candidate component and the second candidate component being included in separate products, to not include the second candidate identity in the one or more candidate identities presented at the mobile device.

7. The method of claim 1, wherein the one or more candidate identities comprises an identity of the training component, and wherein the method comprises:

determining, based on the 3D model file representing the 3D model of the training component, a product hierarchy of the training component; and presenting, at the mobile device, a representation of the product hierarchy.

8. The method of claim 1, wherein the 3D model file representing the training component represents a plurality of components including the training component, and wherein generating the plurality of images comprises isolating the training component from other components of the plurality of components.

9. The method of claim 1, wherein obtaining the 3D model file representing the 3D model of the training component comprises:

converting a source 3D model file, which represents curved surfaces of the training component in a first format, into the 3D model file representing the 3D model of the training component using a mesh in a second format.

10. The method of claim 1, comprising:

processing the one or more candidate identities using a large language model that has been trained using, as training data, a plurality of 3D model files; and presenting, at the mobile device, based on an output of the large language model, a predicted product in which the test component is included.

11. The method of claim 10, wherein the large language model has been trained using, as training data, product description mapping data.

12. The method of claim 10, wherein processing the one or more candidate identities comprises processing a context of the test component using the large language model.

13. The method of claim 1, wherein presenting the one or more candidate identities comprises presenting a virtual reality or augmented reality interface configured to facilitate interaction between a user of the mobile device and a simulated version of the first candidate component.

14. The method of claim 1, comprising:

processing the one or more candidate identities using a large language model that has been trained using, as training data, documents providing information about components corresponding to the one or more candidate identities; and presenting, at the mobile device, based on an output of the large language model, a tutorial relating to the test component.

15. A non-transitory computer-readable medium tangibly encoding a computer program operable to cause a data processing apparatus to perform operations comprising:

obtaining a test image captured by a camera of a mobile device, the test image including a test component;

processing the test image using a machine learning model, wherein the machine learning model has been trained by obtaining a three-dimensional (3D) model file representing a 3D model of a training component, generating a plurality of images of the training component based on the 3D model file representing the 3D model of the training component, wherein the plurality of images differ from one another in at least one of orientation, background, or texture, determining locations of the training component in each of the plurality of images, and training the machine learning model using, as training data, the plurality of images and the locations of the training component, wherein the machine learning model is trained to detect the training component in photographs captured by mobile devices; and presenting, at the mobile device, one or more candidate identities of the test component based on an output of the machine learning model, wherein presenting the one or more candidate identities comprises:

determining a similarity between an image of a first candidate component and an image of a second candidate component, and determining, based on the similarity and based on the first candidate component and the second candidate component being included in separate products, to present at the mobile device a first candidate identity corresponding to the first candidate component.

16. The non-transitory computer-readable medium of claim 15, wherein determining the locations of the training component comprises:

converting the plurality of images to a grayscale format;

determining contours associated with backgrounds of the plurality of images in the grayscale format; and determining the locations of the training component based on the contours.

17. The non-transitory computer-readable medium of claim 15, wherein the machine learning model has been trained by:

determining a second similarity between a first image of the training component and a second image of the training component, the training component having different orientations in the first image and the second image; and in response to the second similarity being above a threshold value, including an image derived from the first image in the plurality of images used to train the machine learning model, and excluding images derived from the second image from the plurality of images used to train the machine learning model.

18. The non-transitory computer-readable medium of claim 15, wherein the one or more candidate identities comprises an identity of the training component, and wherein the operations comprise:

determining, based on the 3D model file representing the training component, a product hierarchy of the training component; and presenting, at the mobile device, a representation of the product hierarchy.

19. The non-transitory computer-readable medium of claim 15, wherein obtaining the 3D model file representing the training component comprises:

converting a source 3D model file, which represents curved surfaces of the training component in a first format, into the 3D model file representing the 3D model of the training component using a mesh in a second format.

20. A system comprising:

one or more processors; and one or more computer-readable mediums encoding instructions that, when executed by the one or more processors, cause the one or more processors to perform operations comprising:

obtaining a test image captured by a camera of a mobile device, the test image including a test component;

processing the test image using a machine learning model, wherein the machine learning model has been trained by obtaining a three-dimensional (3D) model file representing a 3D model of a training component, generating a plurality of images of the training component based on the 3D model file representing the 3D model of the training component, wherein the plurality of images differ from one another in at least one of orientation, background, or texture, determining locations of the training component in each of the plurality of images, and training the machine learning model using, as training data, the plurality of images and the locations of the training component, wherein the machine learning model is trained to detect the training component in photographs captured by mobile devices; and presenting, at the mobile device, one or more candidate identities of the test component based on an output of the machine learning model, wherein presenting the one or more candidate identities comprises:

determining a similarity between an image of a first candidate component and an image of a second candidate component, and determining, based on the similarity and based on the first candidate component and the second candidate component being included in separate products, to present at the mobile device a first candidate identity corresponding to the first candidate component.

* * * * *